United States Patent
von Olshausen et al.

(10) Patent No.: US 10,865,486 B2
(45) Date of Patent: Dec. 15, 2020

(54) ELECTROLYSIS METHOD AND ELECTROLYSIS SYSTEM COMPRISING RECIRCULATING FLUSHING MEDIA

(71) Applicant: SunFire GmbH, Dresden (DE)

(72) Inventors: Christian von Olshausen, Dresden (DE); Joerg Brabandt, Dresden (DE); Dirk Schaarmann, Dresden (DE)

(73) Assignee: SunFire GmbH, Dresden (DE)

( * ) Notice: Subject to any disclaimer, the term of this patent is extended or adjusted under 35 U.S.C. 154(b) by 304 days.

(21) Appl. No.: 15/316,641

(22) PCT Filed: Jun. 4, 2015

(86) PCT No.: PCT/DE2015/100223
§ 371 (c)(1),
(2) Date: Dec. 6, 2016

(87) PCT Pub. No.: WO2015/185039
PCT Pub. Date: Dec. 10, 2015

(65) Prior Publication Data
US 2017/0175277 A1 Jun. 22, 2017

(30) Foreign Application Priority Data
Jun. 6, 2014 (DE) .................. 10 2014 108 085

(51) Int. Cl.
| | |
|---|---|
| *C25C 7/06* | (2006.01) |
| *C25C 3/08* | (2006.01) |
| *C25C 3/22* | (2006.01) |
| *C25C 7/00* | (2006.01) |
| *C25C 7/02* | (2006.01) |
| *C25B 1/12* | (2006.01) |
| *C25B 15/02* | (2006.01) |

(Continued)

(52) U.S. Cl.
CPC .................. *C25B 1/12* (2013.01); *C25B 1/00* (2013.01); *C25B 1/10* (2013.01); *C25B 9/08* (2013.01); *C25B 9/10* (2013.01); *C25B 9/18* (2013.01); *C25B 13/00* (2013.01); *C25B 15/02* (2013.01); *C25B 15/08* (2013.01); *Y02E 60/36* (2013.01)

(58) Field of Classification Search
CPC .... C25C 7/06; C25C 3/08; C25C 3/22; C25C 7/00; C25C 7/02
USPC ........................................................ 205/349
See application file for complete search history.

(56) References Cited

U.S. PATENT DOCUMENTS

| | | | |
|---|---|---|---|
| 4,950,371 | A | 8/1990 | McElroy |
| 6,375,812 | B1 | 4/2002 | Leonida |

(Continued)

FOREIGN PATENT DOCUMENTS

| | | |
|---|---|---|
| DE | 2549471 A1 | 5/1977 |
| DE | 69002359 T2 | 11/1993 |

(Continued)

OTHER PUBLICATIONS

International Search Report dated Oct. 9, 2015, in International Application No. PCT/DE2015/100223.

*Primary Examiner* — Zulmariam Mendez
(74) *Attorney, Agent, or Firm* — Patent Central LLC; Stephan A. Pendorf

(57) ABSTRACT

An electrolysis method comprising an electrolysis cell (4), which method uses at least one recirculating flushing medium (50, 60). The invention further relates to an electrolysis system, in particular for carrying out the electrolysis method.

18 Claims, 2 Drawing Sheets

Figure 1:
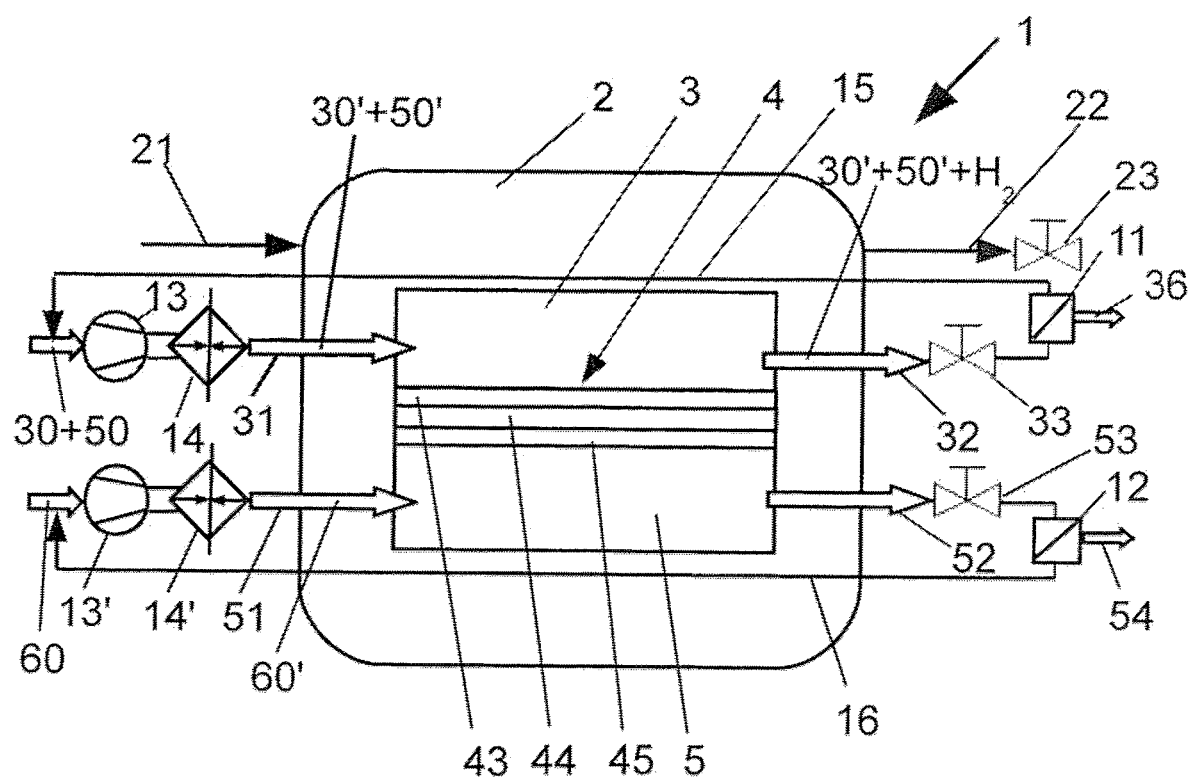

(51) Int. Cl.
*C25B 15/08* (2006.01)
*C25B 1/00* (2006.01)
*C25B 9/08* (2006.01)
*C25B 1/10* (2006.01)
*C25B 9/10* (2006.01)
*C25B 9/18* (2006.01)
*C25B 13/00* (2006.01)

(56) References Cited

U.S. PATENT DOCUMENTS

| | | |
|---|---|---|
| 2006/0049039 A1 | 3/2006 | Brand et al. |
| 2010/0187128 A1 | 7/2010 | Neubert et al. |
| 2012/0325654 A1 | 12/2012 | Le Gallo et al. |
| 2014/0272734 A1* | 9/2014 | Braun .................. C10K 1/04 431/11 |

FOREIGN PATENT DOCUMENTS

| | | |
|---|---|---|
| DE | 10258525 A1 | 7/2004 |
| DE | 102007017613 A1 | 10/2008 |

* cited by examiner

ELECTROLYSIS METHOD AND ELECTROLYSIS SYSTEM COMPRISING RECIRCULATING FLUSHING MEDIA

The invention relates to an electrolysis method with an electrolysis cell. The invention also relates to an electrolysis system, in particular for carrying out an electrolysis method.

Furthermore, according to the invention, an electrolysis method is carried out with at least one electrolysis cell, wherein from reactant gas and/or reactant vapor a product gas is produced at a cathode of the electrolysis cell in the form of hydrogen and/or carbon monoxide and at an anode of the electrolysis cell in the form of oxygen, and the cathode is supplied with a cathode flushing medium for an at least partial transport away of the hydrogen and/or carbon monoxide from the cathode and the anode is supplied with an anode flushing medium for an at least partial transport away of the oxygen from the anode.

For the conversion of electrical to chemical energy, electrolysis is currently regarded as a useful method for large-scale applications. Electrolysis is a method in which an electric current forces a redox reaction. Since, during electrolysis, some of the electrical energy used is converted into chemical energy, electrolyses can be used for energy storage in the electrolysis products. During water electrolysis, water is decomposed to hydrogen at the cathode and oxygen at the anode of the electrolysis cell.

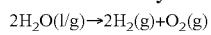

Electrolysis of carbon dioxide produces carbon monoxide at the cathode and oxygen at the anode of the electrolysis cell.

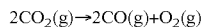

The electrolysis can be carried out at low temperatures using an acidic, an alkaline or a PEM (proton exchange membrane) electrolyser or at high temperatures using oxide ceramic electrolytes (SOEC—solid oxide electrolyser cell). Since high-temperature electrolysis (HTEL) for production of hydrogen is fed with steam instead of liquid water, high-temperature electrolysis requires a lower energy expenditure compared to electrolyses running at normal temperature. This is because the fission energy of steam is about 16% lower than the fission energy of liquid water. The difference corresponds to the evaporation enthalpy of water. Due to the use of waste heat of exothermic downstream processes, the generation of steam is neutral with regard to the electrical efficiency of the electrolysis. Since the electrical energy costs dominate the aggregate electrolysis costs, high temperature electrolysis offers a significant economic advantage.

A high temperature electrolysis method is known from the prior art, for example, from the document DE 25 49 471 A1, in which the oxygen formed in the electrolysis cells on the anode side is diluted by means of a stream of steam or another gas stream inert towards the materials used. The oxygen discharged from the anode together with the steam stream is recovered after condensation of the accompanying steam. This approach results in a reduction in the oxygen partial pressure on the anode side of the electrolysis cells, which for thermodynamic reasons leads to a reduction in the required electrolytic voltage, which is accompanied by an improvement in efficiency. In addition, the proposed methodology results in a reduction in oxidation and corrosion problems at the anode side.

PROBLEMS IN THE PRIOR ART

In the context of an overall method with the aim of producing synthetic gases or liquid fuels, the operation of electrolysis under elevated pressure plays a decisive role. The conversion and synthesis stages which take place following the electrolysis are usually carried out at superatmospheric pressures. In order to save a very energy-intensive and thus expensive compression between electrolysis and the subsequent processes, the high-temperature electrolysis should already be pressure-charged. The steam necessary for the high-temperature electrolysis of water and/or the high-temperature electrolysis using carbon dioxide can already be provided for this purpose at elevated starting pressure. With this concept, only the steam and/or the carbon dioxide have to be compressed to the process pressure. This is energetically much cheaper than compression of hydrogen or carbon monoxide after the electrolysis stage.

In order to meet the above-described requirements for the pressure, it would be necessary in the known method to bring the used recirculating gas to be supplied again and again to the anode to the pressure level of the high-temperature electrolytic cell since damage can be caused by possible pressure differentials in the electrolysis module. The compression required depends upon the selection of the media and is at the expense of the overall efficiency of the electrolysis system. Gaseous media, such as the steam proposed in the publication DE 25 49 471 A1, have a high compressibility and thus require a relatively high compressor power.

In addition, with respect to the method described in the publication DE 25 49 471 A1, it must be noted that a preliminary evaporation of water is necessary for the intended flushing with steam, which reduces the overall efficiency of the electrolysis method. Further, the externally supplied water has to be pretreated in the method of publication DE 25 49 471 A1.

Furthermore, in the known method, the flush gas must be brought into the temperature range of high-temperature electrolysis, that is, to a temperature between 800 and 900° C., since otherwise too high thermomechanical loads and conductivity losses occur in the electrolysis module. For bringing the flush gas to temperature, additional energy is therefore necessary, which lowers the overall efficiency. An attempt is made to compensate for this by the method of the publication DE 25 49 471 A1 by transferring the heat content of the oxygen derived from the anode to the feed vapor prior to release. This can be realized by means of a heat exchanger, which, however, entails higher investment costs.

When using flushing gas in the system of publication DE 25 49 471 A1, the media costs must also be considered. Although the necessary flushing gas quantities are not listed in this publication, a continuous media consumption during electrolysis is to be expected. The resulting costs reduce the profitability of high temperature electrolysis.

The object of the present invention is to provide an electrolysis method and an electrolysis system which enable a more economical operation of an electrolysis cell system than is possible up to now in the prior art.

This object is achieved by an electrolysis method according to the main claim. The object is also achieved by an electrolysis system according to the associated claim.

Furthermore, it has been found that, for the purpose of increasing the performance of the carried out electrolysis, it is advantageous to carry out a flushing at the electrode located on the anode side of an electrolysis cell in order to remove the oxygen formed there. In this case, a rinsing or purge is understood to involve an additional supply of gases and/or other media in order to dilute and transport the gases and/or media located in the flushed area or formed there.

The electrolysis method with an electrolysis cell, operated in a temperature range from 300° C. to 1500° C., comprises the steps:

feeding a reactant to the electrolysis cell,
wherein a product gas is produced at the cathode of the electrolysis cell and oxygen is produced at the anode of the electrolysis cell,
at least partially removing the oxygen by means of at least one first flushing
medium supplied to the electrolysis cell, wherein the flushing medium is inert to the oxygen,
at least partially separating the flushing medium/oxygen mixture in a separating device into the components oxygen and at least the first flushing medium,
recirculating by reintroducing the separated at least first flushing medium into the electrolysis cell, and discharging the separated oxygen out of the method.

In the electrolysis method according to the invention, the cathode and/or the anode flushing medium is recirculated, i.e., introduced or reintroduced after flushing the cathode and/or the anode. As a result, in addition to the advantageous effects of the flushing of the respective electrode, namely the reduction of power consumption and the reduction of unwanted chemical reaction at the respective flushed electrode, a clear improvement in the overall efficiency of the inventive method compared to the prior art results. Thus, by the recirculation of the respective flushing medium, the originally contained thermal energy and its pressure can be further utilized almost without loss. Furthermore, by the recirculation guidance of the respective flushing medium, a continuous flushing of the respective electrode can be ensured. As a result, gasses and/or media which are disadvantageous, for example, corrosive or oxidative of the electrode, can be continuously transported away from the flushed electrode, as a result of which the service life of the at least one flushed electrolysis cell can be increased and maintenance and investment costs reduced.

An at least partial transporting away of the product gas by flushing with a second flushing medium can occur and the flushing medium/product gas mixture can be separated in a separating device into the components product gas and at least the second flushing medium, wherein a recirculation of the separated at least second flushing medium or flushing medium/product gas mixture or the product gas by re-introduction into the electrolysis cell and an at least partial transporting away of the product gas out of the method takes place, wherein the at least one second flushing medium is inert to the product gas.

The electrolysis method can be operated on at least one electrolysis cell, wherein oxygen is formed from reactant vapor and/or reactant gas at a cathode of the electrolysis cell, and the cathode is supplied is a cathode flushing medium for the at least partial removal of the hydrogen and/or carbon monoxide from the cathode and/or the anode is supplied with an anode flush medium for the at least partial removal of the oxygen from the anode; and wherein, when the cathode is flushed, at least the cathode flushing medium is guided in a cathode flushing recirculation circuit, in which the cathode flush medium is enriched at the cathode with hydrogen and/or carbon monoxide to form a cathode flushing medium/product gas mixture which may contain reactant vapor or reactant gas, subsequently at least when the cathode flushing medium is not the product gas, at least one medium of the cathode flushing medium/product gas mixture is at least partly separated from the cathode flushing medium/product gas mixture, and the cathode flushing medium and/or the product-gas-depleted cathode flushing medium/ product gas mixture are thereafter again supplied to the cathode; and/or when the anode is flushed, the anode flushing medium is guided in an anode flushing circuit, in which the anode flushing medium is enriched at the anode with oxygen to form an anode flushing medium/oxygen mixture, subsequently the oxygen of the anode flush medium/oxygen mixture is at least partially separated from the anode flush medium and the anode flushing medium and/or the oxygen-depleted anode flushing medium/oxygen mixture is thereafter fed back to the anode.

The cathode flushing medium and/or the anode flushing medium can be a medium, preferably a gas or gas mixture, which has at least one electrolyte reactant and/or at least one product of the electrolysis and/or at least one medium which is not involved in the electrolysis.

Thus, in the method according to the invention, a reactant or a reactant-gas mixture can be recirculated, that is to say, can be fed again in the circuit to the electrode to be supplied and flushed with the reactant. Thus, in the method according to the invention, for example, steam which has not been consumed during the electrolysis can be recirculated, that is to say, can again be fed in the circuit to the cathode for reactant feed and simultaneous cathode flushing.

According to the present invention, there is not only the possibility of flushing the oxygen electrode, that is, the anode side, of the at least one electrolysis cell. Alternatively or in addition thereto, the cathode side of the at least one electrolysis cell, on which hydrogen and/or carbon monoxide is formed, can also be flushed with at least one suitable flushing medium. However, it is also possible not to flush the cathode side.

The actual aim of the flushing is to reduce the respective partial pressure at the flushed electrode. For example, flushing the anode leads to a reduction in the oxygen partial pressure at the anode, which reduces the corrosive properties of oxygen at the anode. Furthermore, a high concentration of the gas formed on the electrode leads to a reduction in the electrochemical performance of the electrolysis cell. The use of flushing medium, which contains the reaction gas to be supplied to, and/or the product gas formed at, the respective electrode, leads to the removal of the gas produced at the respective electrode, however, the partial pressure reduction at the respective electrode does not take place in the same manner as with a flushing medium which does not contain the reactant gas to be supplied to the respective electrode and/or the product gas formed. The power influence is dependent on the amounts of the flushing medium used and the therefrom resulting gas composition at the respective electrode.

The electrolysis method can be carried out in such a way that less than 100% of the reactant is reacted into product gas, so that an at least partial removal of the product gas takes place through the unreacted reactant, wherein the product-gas-reactant mixture is separated, at least partially, into the components product gas and reactant in a separating device, wherein a recirculation of the separated reactant or product-gas-reactant mixture and an at least partial discharge of the separated product gas results from the method.

Furthermore, in the method according to the invention, part of the product gas or the product-gas-reactant gas mixture can also be recirculated in whole or in part as or with the cathode and/or anode flush medium, that is, supplied in the circuit again to the electrode to be flushed. For example, in the method according to the invention, a part of the hydrogen generated at the cathode can be recirculated, that is to say, the can again be fed in the recirculation circuit to the cathode for the flushing thereof. In the latter case, it is not necessary, according to the invention, to separate the hydrogen completely from the cathode flushing medium/product gas (hydrogen)-mixture.

As a result of the recirculation of the reactant, such as steam or carbon dioxide, which is possible in the electrolysis method according to the invention, the amount of starting material or reactant to be supplied to the electrolysis cell can be kept lower. This results in a high conversion rate, for example, in the electrolysis of steam, a high percentage of the steam is converted to hydrogen. The same applies when carbon dioxide is used as a starting material instead of or in addition to steam, and carbon dioxide is recirculated, thereby increasing the conversion rate of carbon dioxide.

The electrolysis cell can in particular be operated in a temperature range from 600° C. to 1000° C.

The efficiency of an overall method involving the electrolysis method according to the invention can be further increased if, in a first embodiment of the electrolysis method according to the invention, at least one gas outlet of the electrolysis cell is coupled to a gas inlet of the electrolysis cell, forming a gas circuit, and at least a part of the unreacted reactant gas or unreacted reactant steam and/or flush medium containing product gas formed by the electrolysis cell is recirculated in this gas circuit and used as an input gas for the electrolysis. For this purpose, for example hydrogen can be separated from a product gas mixture which is still produced with the electrolysis method and still contains steam, at least a portion of the hydrogen-depleted product gas mixture can be removed and recycled to a method gas input of the electrolysis cell. In this way, it is possible to reduce the steam content contained in the hydrogen gas to be produced. This results in a drier product gas. The overall conversion rate of the electrolysis system is increased by recycling an unused reactant or a product gas mixture containing the reactant to the process inlet, that is to say, re-feeding the unused reactant to the cathode of the electrolysis cell.

It is useful when a hydrogen-depleted portion of a hydrogen/steam gas mixture formed with the electrolysis method and/or a carbon monoxide/carbon dioxide gas mixture enriched with the electrolysis method is supplied to at least one process inlet of the electrolysis method by means of at least one recirculation fan and/or at least one jet pump. In addition to the renewed reactability of the recycled reactant, a further advantage of this procedure is that the hydrogen and/or the carbon monoxide recycled back to the process inlet provide a reducing atmosphere on the steam side of the electrolysis cell, wherein the reducing atmosphere diminishes the probability of degradation of the cathode, here the hydrogen electrode. Thus, it is in principle possible in this procedure that the recycled reactant/product gas mixture is used as the flushing medium, so that no or only a small amount of flushing medium has to be introduced into the process.

In principle, this method makes it possible to separate and remove hydrogen to a great extent from the hydrogen/steam mixture, for example to a percentage of 80 to 99% of the hydrogen contained in the hydrogen/steam mixture, and to recirculate the remaining steam with the small residual fraction of hydrogen.

However, from the hydrogen/steam mixture formed in the electrolysis method according to the invention, it is also possible to branch off a portion of the formed hydrogen/steam mixture, then remove hydrogen and subsequently return it to the process inlet, whereby the non-recirculated hydrogen/steam mixture maintains its moisture content.

Furthermore, it is possible in the method according to the invention, that a portion of a flushing gas, such as hydrogen, for example, containing product gas mixture is recycled to the process inlet without separation of its components. This procedure can be used, for example, in order to supply less fresh purge gas at the process inlet.

As a reactant, water and/or carbon dioxide can be used as gas, vapor and/or gaseous vapor, wherein as product gases hydrogen and/or carbon monoxide are formed depending upon the reactants used.

Prior to reintroduction into the cathode flushing circuit/anode flushing circuit, heating and/or compressing of the at least first/second flushing medium can take place.

An additional method feature for increasing the efficiency of the electrolysis method according to the invention can be that the product gas is at least partially separated from the flushing medium/product gas-mixture produced after the flushing of an electrode, wherein the product gas is oxygen or hydrogen and/or carbon monoxide. The consequence of this is that the flushing medium/product gas mixture, at least partly depleted of product gas, does not return the separated product gas to the electrode again during a subsequent flushing of the respective electrode, but rather removes the newly formed product gas at the electrode.

The electrolysis system, in particular for carrying out an electrolysis method according to the invention, comprises at least three pressure chambers separate from one another, namely an anode space, a cathode space, which together form the electrolysis cell, and a container space, wherein the anode space and the cathode space are arranged within the container space;

for feeding a reactant into the cathode chamber and for feeding at least one first flushing medium into the anode space there is provided in each case at least one media feed line;

for transporting away at least the first flushing medium and the oxygen resulting from the electrolysis out of the anode space and for the transport away of a product gas produced by the electrolysis out of the cathode space, in each case at least one outgoing line is provided;

either the anode space or the cathode space is connected to the container space, such that a gas flow between the two connected chambers is possible, and at least one flushing circuit is provided, so that at least the anode space can be flushed with the first flushing medium.

Furthermore, the electrolysis method can be operated on at least one electrolysis cell, in which process gas is formed from reactant gas and/or reactant vapor at a cathode of the electrolysis cell in the form of hydrogen and/or carbon monoxide and oxygen is formed at an anode of the electrolysis cell, wherein at least one cathode compartment at the cathode, at least one anode compartment at the anode, and at least one container space surrounding the electrolysis cell, is filled with a vapor or gas which is non-reacting with oxygen and hydrogen and/or carbon monoxide, wherein the at least one cathode compartment, the at least one anode compartment and the at least one container space are formed as separate pressure chambers, and wherein the at least one container space is connected to the at least one anode space or the at least one cathode space for a gas flow between these pressure chambers.

A separation device for separating the at least first flushing medium/oxygen can be provided downstream of the electrolysis cell in the at least one flushing circuit, the at least first flushing medium being recirculated via the at least one flushing circuit, and the oxygen being able to be removed from the electrolysis system via a line.

The separation of the hydrogen from the cathode flushing medium/hydrogen mixture can be carried out with at least one separating device, which separates either hydrogen or cathode flushing medium from the cathode flushing medium/hydrogen mixture. The separation of carbon monoxide from the cathode flushing medium/carbon monoxide mixture can be carried out with at least one separating device, which separates either carbon monoxide or cathode flushing medium from the cathode flushing medium/hydrogen mixture. The separation of oxygen from the anode flushing medium/oxygen mixture can be carried out with at least one separating device, which separates either oxygen or anode flush medium from the anode flushing medium/oxygen mixture.

In order to prevent a continuous enrichment of the respective flushing medium with the product gas formed at the respective electrode, the product gas formed at the respective electrode is preferably separated from the flushing medium within the cathode flushing circuit or the anode flushing circuit, wherein it does not matter which medium is being separated from which other medium. According to a suitable exemplary embodiment of the present invention, it is provided that the separating device has at least one separating membrane and/or a porous separating structure, to which the flushing medium/product gas mixture, which can also contain the reactant gas and/or the reactant vapor, is conveyed and which is flowed through by at least one medium contained in the flushing medium/product gas mixture at a different rate than the other medium or media contained in the flushing medium/product gas mixture.

A plurality of electrolysis cells with anode spaces and cathode spaces can be arranged within the container space, the cathode spaces being connected to one another and the anode spaces being connected to one another, so that a plurality of cathode spaces form a common cathode space, and a plurality of anode spaces form a common anode space.

For the supply of gas or the removal of gas, pressure regulating units can be provided upstream of, downstream of, or in the anode chamber and/or the cathode chamber, by means of which the respective pressure in the pressure chambers can be adjusted.

Preferably, in the method according to the invention, the respective pressure in the pressure chambers is set via at least one valve, which is provided at an inlet and/or an outlet of the anode chamber and/or the cathode chamber and is controlled, for example, by at least one differential pressure regulator.

Two flushing circuits can be provided, so that the anode space can be flushed with a first flushing medium and the cathode space can be flushed with a second flushing medium and/or the reactants.

For recirculation by means of the at least one flushing circuit, a recirculation blower and/or a jet pump and/or heater/heat exchanger can be provided In an advantageous embodiment of the present invention, the cathode flushing medium is guided in a closed cathode flushing circuit to which the cathode flush medium can be fed and from which at least hydrogen or at least carbon monoxide can be extracted and/or the anode flushing medium is guided in a closed anode flushing circuit to which anode flush medium can be fed and from the at least oxygen can be extracted. In the closed cathode flushing circuit and/or in the closed anode flushing circuit, for example an inert or noble gas, at the working temperature and working pressure of the electrolysis, is passed in a circuit through the cathode space or the anode space of the electrolysis cell.

In order to keep the material load of the individual components of the electrolysis cell low, it is recommended, that the cathode flushing medium prior to its introduction into the cathode flushing circuit and/or within the cathode flushing circuit and/or that the anode flushing medium prior to its introduction into the anode flushing circuit and/or within the electrolysis cell is brought to an operating temperature of the electrolysis cell with at least one heat exchanger or heater and/or is brought to a working pressure of the electrolysis cell with at least one compressor and/or at least one jet pump. By means of the at least one compressor, pressure losses, for example, in the case of introducing external flushing medium from a feed line can be compensated. Furthermore, it is possible with the at least one compressor to compensate for pressure losses during recirculation of gases in the method according to the invention. In this case, it is an advantage of the method according to the invention that only one residual compression of a gas or gas mixture, which has already been at least partially compressed, which has already at least partially passed through the electrolysis method, must be carried out by the at least one compressor or the at least one jet pump. For this residual compression, a lower compressor performance is required in the method according to the invention than in methods known from the prior art, in which only "fresh" gases are fed to the electrolysis cell.

A special embodiment is provided when a temporary connection between the anode chamber and the cathode chamber is provided and can be switched during the startup and/or shutdown operation of the electrolysis cell, so that a gas flow between the two connected chambers is possible during a startup and/or shutdown operation.

In a further development, it is provided that at least one anode space is connected to at least one cathode space for a gas flow and an associated pressure adjustment or equalization between these pressure chambers in a startup and/or shutdown operation of the electrolysis method.

Furthermore, the at least one separation device can be formed with at least one separation membrane and/or a porous separation structure and/or a sorbent and/or pressure and/or temperature change adsorption system.

It is also possible to use a separating device with at least one sorbent, to or into which the flushing medium/product gas mixture, which can also contain the reactant gas, is passed, and which adsorbs at least one medium contained in the flushing medium/product gas mixture more strongly or more weakly than at least one other medium contained in the flushing medium/product gas mixture.

In the present invention, for example, at least one separating fluid can be used, which at least partially absorbs hydrogen or steam or the cathode flushing medium from the cathode flushing medium/hydrogen mixture, and/or absorbs carbon monoxide or carbon dioxide or the cathode flushing medium at least partially from the cathode flushing medium/carbon monoxide mixture and/or the oxygen or the anode flushing medium at least partly from the anode flushing medium/oxygen mixture. When a separating liquid is used as a sorbent, the flushing medium/product gas mixture, which may also contain the reactant gas and/or the reactant vapor, can be cooled and then passed through the separating liquid which, for example, absorbs oxygen from an anode flushing medium/oxygen mixture. The oxygen-depleted flushing medium can then be heated by recoupment in the countercurrent of a product gas of the electrolysis cell and passed back into the electrolysis cell.

Furthermore, it has also been found to be advantageous if, in the present invention, at least one medium of the cathode flushing medium/product gas mixture, which can also contain the reactant gas and/or the reactant vapor, is separated from at least one further medium of the cathode flushing medium/product gas mixture and/or at least one medium of the anode flushing medium/oxygen mixture is separated from at least one other medium of the anode flushing medium/oxygen mixture using at least one pressure and/or a temperature-change adsorption process.

The most efficient method is a pressure swing adsorption (PSA) method at the working temperature of the electrolysis. However, it is also possible to cool the cathode flushing medium/product gas mixture and/or the anode flushing medium/oxygen mixture, passing it through a membrane at lower temperatures and heating it before reintroduction into the electrolysis cell. A heat transfer medium can transfer heat between the gas flowing from the membrane and the gas flowing to the membrane. In any case, the pressure loss should be as low as possible when passing through the membrane. The pressure loss should then be compensated by means of at least one compressor in order to be able to recycle the respective flushing medium to the method.

In a further variant of the present invention, it is also possible to separate by cryogenic gas fractionalization at least one medium of the cathode flushing medium/product gas mixture, which can also contain reactant gas and/or reactant vapor, from at least one further medium of the cathode flushing medium/product gas mixture and/or oxygen of the anode flushing medium/oxygen mixture from the anode flush medium of the anode flush medium/oxygen mixture.

According to a further exemplary embodiment of the method according to the invention, it is provided to chemically separate at least one medium of the cathode flushing medium/product gas mixture, which may also contain the reactant gas and/or the reactant vapor, is from at least one further medium of the cathode flushing medium/product gas mixture and/or oxygen of the anode flushing medium/oxygen mixture from the anode flushing medium of the anode flushing medium/oxygen mixture.

The chemical separation can, for example, take place by at least partially combing product gas of the cathode flush medium/product gas mixture and/or oxygen of the anode flushing medium/oxygen mixture.

A cooling system for cooling the medium/media supplied to the separating device can be provided according to the invention, whereby the heat which can be extracted there can be used recuperatively for heating the medium/media to be supplied.

In order to facilitate the operating conditions of the separating device(s) and, if necessary, the necessary pressure-loss-compensating circulation compressor, in the method according to the inventive electrolysis method, the cathode flushing medium/product gas mixture, which may also contain the reactant gas and/or the reactant vapor, can be cooled prior to being supplied to a separating device, and the cathode flushing medium/product gas mixture depleted of product gas with the separating device is warmed prior to being supplied to the cathode, and/or the anode flushing medium/oxygen mixture can be cooled before it is fed to a separating device, and that the anode flushing medium/oxygen mixture depleted of oxygen with the separating device can be warmed prior to being supplied to the anode.

It is particularly effective to carry out the method according to the invention in such a way that the cathode flushing medium flowing into the cathode can be heated by the cathode flushing medium/product gas mixture, which may also contain the reactant gas and/or the reactant vapor, flowing away from the cathode and/or the anode flushing medium flowing to the anode is heated by the flushing medium/oxygen mixture flowing away from the anode by at least one heat exchanger. By means of the at least one heat exchanger, the energy expenditure for heating the particular flushing medium used can be kept low. In the at least one heat exchanger, the hot flushing medium/product gas mixture flowing out from the respective electrode heats the cold, inflowing flushing medium. The required quantity of the flushing medium is determined by the gas partial pressure that is suitable for operation at the respective electrode.

The media inflow line(s) and/or outflow line(s) for the anode may terminate upon connection of the anode space to the container space in the container space.

Furthermore, the media inflow line(s) and/or outflow line(s) for the cathode can terminate when the cathode space is connected to the container space in the container space.

The electrolysis cell is a solid oxide electrolyte cell, a solid oxide cell, or a reversible solid oxide cell. Preferably, but not necessarily, in the present invention, a solid oxide electrolytic cell is used as the electrolysis cell using a high temperature electrolytic method.

The first and second flushing medium may be identical, preferably nitrogen being the first and second flushing medium.

Various, compressed or non-compressed media can be used as the flushing medium. Preferably, flushing media are gases, but the flushing medium can also be a liquid.

In a preferred variant of the present invention, at least one fluid which does not chemically react with hydrogen and/or carbon monoxide is used as the cathode flush medium and/or at least one fluid which does not react chemically with oxygen is used as an anode flushing medium. The flushing medium is thus an inert gas or noble gas, such as, for example, argon, or else air or else hydrogen or also steam or else carbon dioxide, this enumeration being merely exemplary and not exhaustive. Non-oxygen-containing gases are particularly suitable as flushing medium in order to prevent corrosion or oxidation at the flushed electrode and to reduce the necessary stresses.

Figure 2:
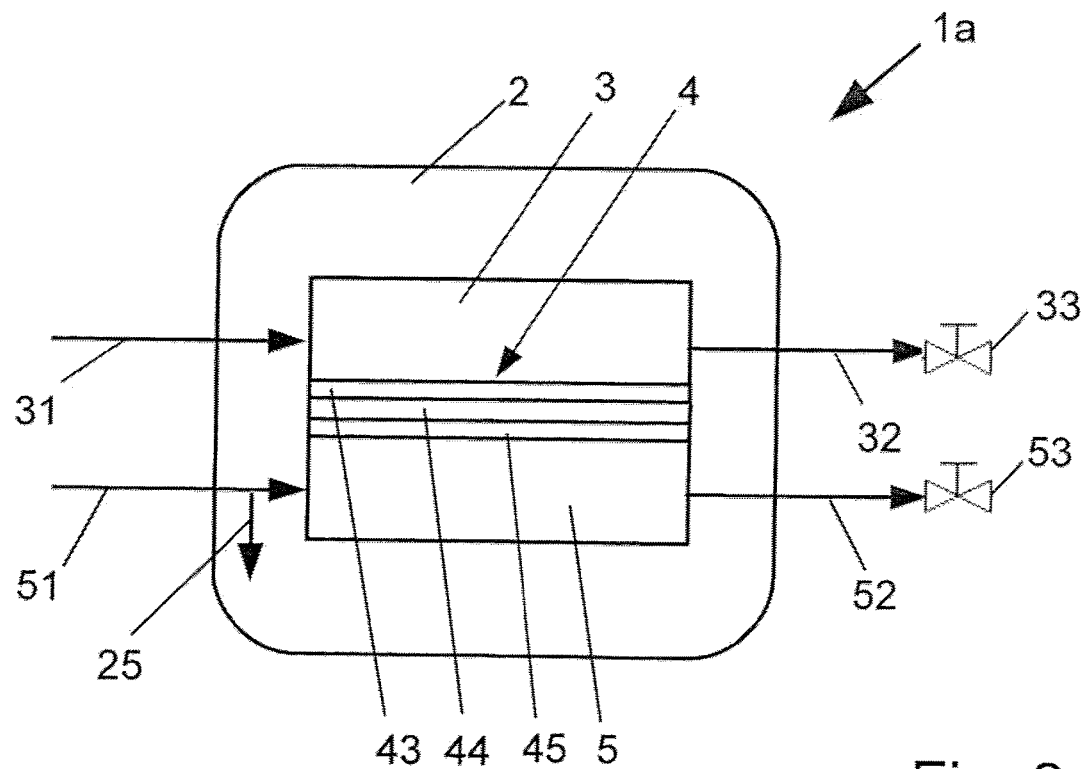
Figure 3:
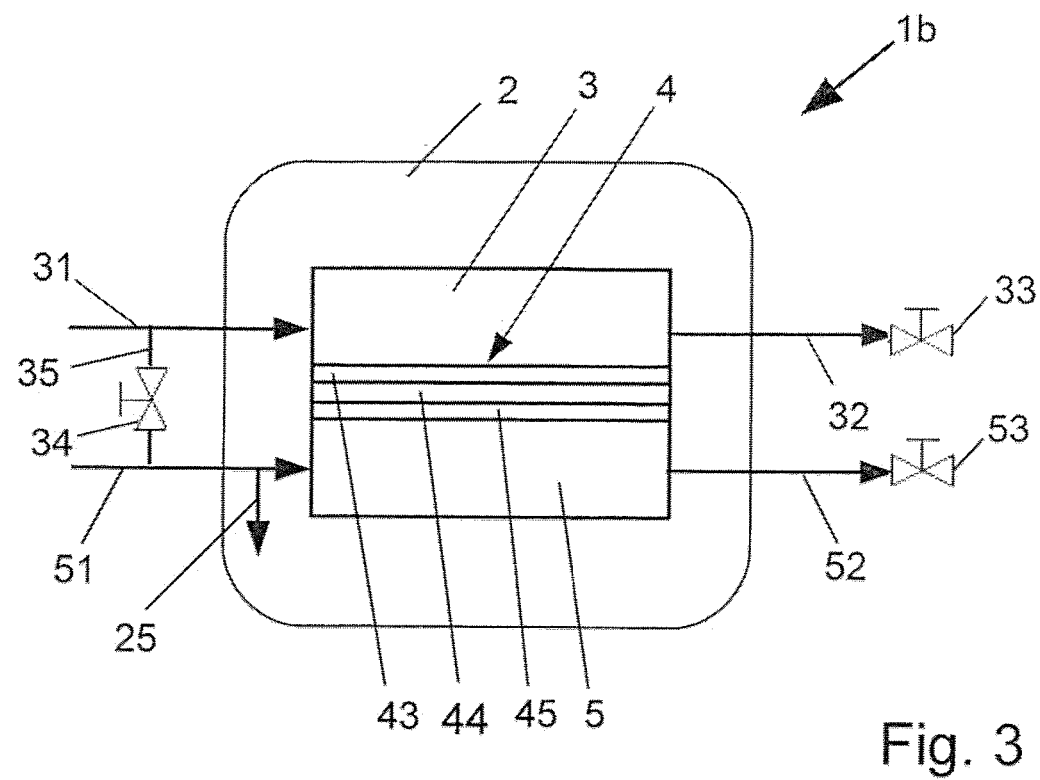
Figure 4:
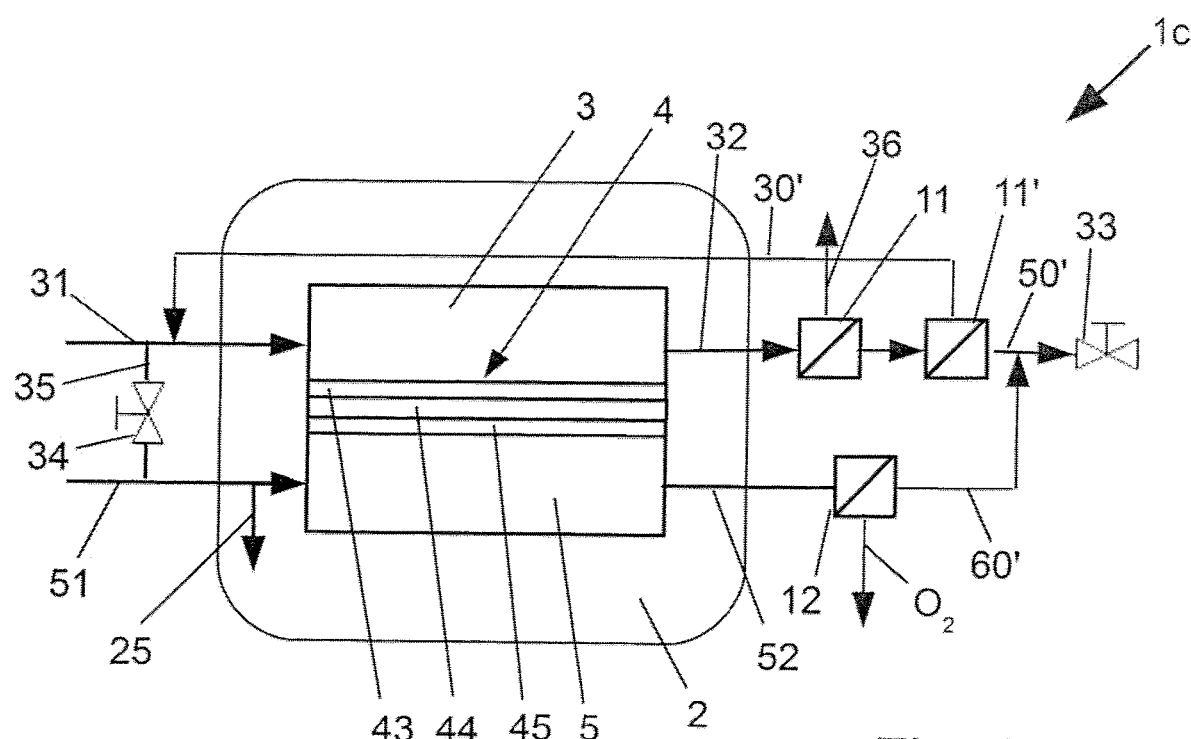

Preferred embodiments of the present invention, the structure, function and advantages thereof, are explained in more detail below with reference to the figures, in which there is shown in:

FIG. 1 an embodiment of the method according to the invention in which a flushing of cathode and anode as well as a differential pressure control between the individual pressure chambers is performed on an electrolyser module schematically shown in the cross-section;

FIG. 2 schematically an embodiment of the method according to the invention with a pressure control at an electrolysis cell by a permanent connection of two pressure chambers;

FIG. 3 schematically an embodiment of the method according to the invention, in which a pressure control is performed at an electrolysis cell by connecting a cathode chamber with an anode space of the electrolysis cell in a startup and/or shutdown operation of the electrolysis method; and FIG. 4 schematically a further embodiment of the method according to the invention in which for pressure control a cathode compartment and an anode compartment of an electrolysis cell are permanently connected to the process output.

DETAILED DESCRIPTION OF THE PREFERRED EMBODIMENTS

In the figures, described in detail in the following, the same reference symbols designate the same features of the present invention, wherein an already described description of the respective identically designated feature also applies to the following figures.

FIG. 1 illustrates an embodiment of the present invention according to a first aspect of the method according to the invention by means of an electrolyser module 1, which is shown schematically in cross-section.

The illustrated electrolyser module 1 has an electrolysis cell 4 with a cathode 43, an anode 45 and an electrolyte 44 located between the cathode 43 and the anode 45. For the sake of clarity, only a single electrolysis cell 4 is shown for the electrolysis module 1. In practice, however, the electrolyser module 1 typically consists of a stack of electrolysis cells 4.

A cathode compartment 3 is provided at the cathode 43. An anode space 5 is located at the anode 45. A container space 2 is provided around the cathode 43, the anode 45, the cathode space 3 and the anode space 5. The electrolysis cell 1 can also be enclosed by further containers or container elements (not shown). In other variants, not shown, of the present invention, several cathode spaces 3 and/or several anode spaces 5 and/or several container spaces 2 can also be provided.

The electrolysis cell 4 used in the example of FIG. 1 is a solid oxide electrolysis cell (SOEC) which uses a solid oxide, such as a ceramic, as an electrolyte 44. As material for the cathode 43 and/or the anode 45, for example, nickel or various ceramics can be used. However, the active principle according to the invention also functions in alkaline, acidic or polymer electrolyte electrolysis cells.

The electrolysis cell 4 shown in FIG. 1 operates at high temperatures between 600 and 1000° C., for example at approximately 850° C. In other embodiments of the present invention, the method according to the invention can also be used at other, lower or even higher temperatures.

A reactant 30 in the form of a reactant gas or reactant steam is fed to the cathode 43 of the electrolysis cell 4 via at least one feed line 31. In the exemplary embodiment of FIG. 1, steam is used as reactant 30. In other exemplary embodiments of the present invention which are not shown, carbon dioxide ($CO_2$) and/or another gas or gas mixture which can be cleaved by means of electrolysis can also be used as reactant 30. A mixture of steam and $CO_2$ can also be used as reactant 30. The reactant 30 does not have to have absolute purity but can also comprise components of other gases.

Between the cathode 43 and the anode 45, a voltage is applied in the electrolysis method carried out in the electrolysis cell 1, which causes oxygen ions ($O_2$—) of the reactant 30 to decomposed in the electrolysis and to be led from the cathode 43 to the anode 45 via the electrolyte 44. At the cathode 43, a reduction of the reactant 30 takes place for this purpose. When steam is used as the reactant 30, gaseous hydrogen ($H_2$) is formed at the cathode 43, and when carbon dioxide is used as the reactant 30, gaseous carbon monoxide (CO) is formed at the cathode 43. An oxidation takes place at the anode 45. In both cases, gaseous oxygen ($O_2$) is formed at the anode 45.

In the electrolysis method illustrated in FIG. 1, the electrolysis cell 4 thus serves to convert water or steam into hydrogen and oxygen. In particular, the hydrogen formed is suitable as an energy carrier. For example, it can be further processed into hydrocarbon(s), such as methanol, in subsequent process steps, as described, for example, in the publication DE 10 2006 035 893 A1.

In the embodiment of FIG. 1, a flushing of the cathode 43 as well as the anode 45 is carried out at the respective electrode 43, 45. In other variants of the present invention (not shown), flushing can also be provided only at the anode 45 or only at the cathode 43. The flushing takes place in each case with a flushing medium 50, 60, which can be the same or else different at the cathode 43 and the anode 45.

Preferably, but not necessarily, the flushing medium 50 used is an inert gas such as, for example, nitrogen, which does not react chemically with the product gas formed at the respective electrode 43, 45. In the electrolysis method according to the invention steam, carbon dioxide, oxygen and/or air can be used as flushing medium 60 on the cathode 43, and steam and/or carbon dioxide as flushing medium 50 at the anode 45.

Both the cathode flush medium 50 used at the cathode 43 and the anode flushing medium 60 used at the anode 45 are each guided in a flushing circuit, the cathode flushing circuit 15 and the anode flushing circuit 16, respectively.

The cathode flushing medium 50 is fed into the electrolysis module 1 via the same supply line 31 of the cathode 43 of the electrolysis cell 4, via which also the reactant 30 is supplied to the cathode 43. In another exemplary embodiment of the present invention, the cathode flushing medium 50 can also be fed to the cathode 43 via a separate supply line. The reactant 30 and the cathode flushing medium 50 are pressurized by a compressor 13. The pressurized reactant-cathode flushing medium mixture 30'+50' is subsequently heated in a heater 14 to the operating temperature of the electrolysis cell 4. The reactant-cathode flushing medium mixture 30'+50', which is at working pressure and working temperature, is then fed into the cathode chamber 3.

Within the cathode chamber 3, the reactant 30' and the cathode flushing medium 50' are passed to the cathode 3. By means of the reduction reaction taking place at the cathode 43, the reactant 30', that is to say the steam supplied in the exemplary embodiment shown, is at least partially converted to hydrogen.

The cathode flushing medium 50' with its flow accompanies the hydrogen formed at the cathode 43, including the unreacted reactant 30'. In other embodiments of the electrolysis method according to the invention, in which carbon monoxide is formed instead of or in addition to hydrogen at the cathode 43, the cathode flushing medium 50' carries the carbon monoxide formed at the cathode 43 as well as the unreacted carbon dioxide. In the embodiment of FIG. 1, a cathode flush medium/carbon mixture 30'+50'+$H_2$ containing steam is thus produced in the cathode chamber 3, or a cathode flushing medium/carbon monoxide mixture 30'+50'+CO containing carbon dioxide in other variants of the electrolysis method.

The cathode flushing medium/hydrogen mixture 30'+50'+$H_2$ can then be fed to a separating device 11. The separating device 11 can, for example, separate hydrogen of the cathode flushing medium/hydrogen mixture 30'+50'+$H_2$ from the further media 30'+50' of the cathode flushing medium/hydrogen mixture 30'+50'+$H_2$. However, it is also possible, for example, to separate the steam from the cathode flushing medium/hydrogen mixture 30'+50'+$H_2$ by means of a condensation device (not shown in FIG. 1).

In variants of the electrolysis method according to the invention, in which instead of or in addition to hydrogen, carbon monoxide is generated at the cathode 43, a carbon monoxide separation can be used instead of the hydrogen separation in which, for example, carbon monoxide of the cathode flushing medium/carbon monoxide mixture 30'+50' is separated from the further media 30'+50'. The separated hydrogen or the separated carbon monoxide can then be discharged via a separate line 36. Typically, the recovered hydrogen or carbon monoxide is subsequently further processed.

However, a substance separation need not absolutely be carried out with the method according to the invention.

The cathode flushing medium/hydrogen mixture 30'+50'+ H$_2$, modified or unchanged with regard to its composition by substance separation, or the cathode flushing medium/carbon monoxide mixture 30'+50'+CO, which is altered or unchanged with respect to its composition by substance separation, is subsequently again fed within the cathode flushing circuit 15 to the cathode compartment 3. This can, as exemplarily illustrated by means of the electrolysis module 1, take place via the same supply line 31, via which also fresh reactant 30 or fresh cathode flush medium 50 is supplied to the cathode chamber 3. It is to be emphasized that the schematic system shown in FIG. 1 illustrates only the principle of the electrolysis method according to the invention, whereby numerous modifications may be made to the line routing, the number and arrangement of the lines, the line connections, the employed fittings, compressors, heaters, heat exchangers, blowers, etc.

The anode flushing medium 60 is fed to the anode space 5 via a feed line 51. The anode flushing medium 60 is here first elevated in a compressor 13' to a working pressure of the electrolysis cell 1. Thereupon, the anode flush medium 6 is heated by a heater 14'.

In other embodiments of the present invention (not shown), compressors 13 and heaters 14 or compressors 13' and heaters 14' can also be provided in reverse order. In addition, heat exchangers can also be used instead of or in addition to the heaters 14, 14'. It is also possible to dispense with heaters, heat exchangers and/or compressors.

The anode flushing medium 60' which is raised to the working pressure and working temperature of the electrolysis cell 4 is fed to the anode chamber 5 via the line 51. Within the anode chamber 5, the anode flushing medium 60' flows past the anode 45. In this case, the flow of the anode flush medium 60' entrains the oxygen formed at the anode 45. The oxygen-enriched anode flush medium 60', after flowing by the anode 45, is fed, in this illustrative example, to an extractor or separator 12. Oxygen and anode flush medium 60' are at least partially separated from each other by means of the separation device 12. The separated oxygen is discharged via a line 54 to the outside.

The oxygen-depleted anode flushing medium/oxygen mixture is returned to the anode space 5 via the anode flushing circuit 16.

At least one recirculation blower can be used in the cathode flushing circuit 15 and/or in the anode flushing circuit 16, which promotes conveyance of at least one reactant of the electrolysis and/or at least one product gas of the electrolysis and/or at least one flushing medium of the electrolysis from the process output to the process input of the electrolysis cell 4. For promoting recirculation, the compressors 13, 13' described above can also be used.

For separating individual media from the gas mixtures resulting from the process according to the invention, different devices and/or methods can be used in the present invention. For example, the separating device used can have at least one separation membrane and/or a porous separation structure, to which the mixture to be separated is guided and which is permeated by the medium to be separated at a different rate from the other medium contained in the mixture.

Furthermore, it is possible to provide a separating device with at least one sorbent, to or into which the respective mixture is passed, the sorbent adsorbing the medium to be separated more strongly or more weakly than the other medium contained in the mixture. As a sorbent, for example, a separating liquid can be used.

A pressure and/or alternating adsorption process, a cryogenic gas separation and/or a chemical separation can also be used to separate the components of the gas mixture formed in the respective rinse circuits. In order to chemically separate the constituents of the particular mixture from one another, for example, burning can be used.

The at least one cathode compartment 3, the at least one anode compartment 5 and the at least one container compartment 2 of the electrolyser module 1 are each formed as separate pressure chambers, i.e., as spaces in which the internal pressure of the respective compartment can be formed or adjusted separately from the internal pressure of the other compartments. In this way, at least three separate pressure chambers are present on the electrolysis module 1 according to FIG. 1: at least one cathode chamber 3, which contains water vapor, hydrogen and the cathode rinse medium 50, which can also be water vapor and/or hydrogen; at least one anode space 5, which has oxygen and the anode rinsing medium 60 in its interior, and the surrounding pressure vessel 2 of the electrolysis module 1.

The container space 2 is filled via a line 21 with a gaseous medium such as, for example, nitrogen or another inert gas. The gas can be discharged from the container space 2 via a line 22.

Since the thin ceramic membranes of the electrolyte 44 of the electrolysis cell 4, which are used in the example, are sensitive to differential pressures in the range of some 10 . . . 100 mbar, a very precise regulation of the volume flows of the supplied media is necessary to adjust the internal pressures in the different pressure chambers of the electrolysis module 1 in consideration of the mass flow in of the electrolysis cell 4.

In addition, the pressure within the pressure vessel 2 must be adjusted close to the pressure of the cathode space 3 and the anode space 5 in order to keep the material stress inside the container space 2 as low as possible. The phase of the system start is particularly critical when all three pressure chambers 2, 3, 5 of the electrolysis module 1 have to be brought from ambient pressure into the operating pressure of the electrolysis cell 4 synchronously.

The present invention includes various variants to enable such pressure matching.

For example, in the electrolyser module 1 of FIG. 1, valves 23, 33, 53 are provided in the line 22 leading from the container space 2, the line 32 emerging from the cathode space 3, and the line 52 emerging from the anode space 5. An generic valve for regulating the absolute pressure of the electrolysis module 1 can be used by the valves 23, 33, 53, while the two other valves can be used to regulate the differential pressure to the line with the absolute pressure control.

In FIGS. 2 to 4, only the components and media lines relevant to the pressure control are shown for a simplified representation of the pressure control principles used according to the invention. The pressure control principles illustrated in FIGS. 1 to 4 can be applied to different types of electrolysis cells together with or independently of the electrode flushings discussed with reference to FIG. 1.

FIG. 2 shows an embodiment of the electrolysis method according to the invention on the basis of a schematically illustrated electrolysis cell 1a. In the electrolysis cell 1a, a connection between the pressure vessel 2 and the anode space 5 is provided via a line 25. Via the line 25, flushing medium can be directed into the interior of the container chamber 2 through the line 51 leading to the anode chamber 5. As a result, the same pressure as in the anode space 5 is established in the container space 2, so that the differential pressure control used in FIG. 1 between the container space 2 and the anode space 5 can be dispensed with here.

FIG. 3 shows an embodiment of the electrolysis method according to the invention on the basis of a schematically illustrated electrolysis cell 1b. In the electrolysis cell 1b, in which the container space 2 is connected to the anode compartment 5 via a line 25, a connection of the cathode compartment 3 with the anode compartment 5 is produced in a start-up mode and/or a shut-down mode of the electrolysis cell 4. This connection is realized by a valve 34 provided between the media feed lines 31 and 51. Thus, a pressure equalization can be established between the cathode chamber 3 and the anode chamber 5 in the start-up operation and/or the withdrawal operation of the electrolysis cell 4 via a supply of flushing medium. In this way, the differential pressure control between the cathode chamber 3 and the anode chamber 5 used in the electrolysis module 1 of FIG. 1 can be dispensed with in the start-up operation and/or the starting-up operation of the electrolysis cell 4, and all the pressure chambers 2, 3 are evenly brought to a certain pressure level. In this embodiment of the method according to the invention, the absolute pressure can be regulated via the valves 33 and 53 or via only one of the valves 33, 53, the other being closed.

FIG. 4 shows an embodiment of the electrolysis method according to the invention on the basis of a schematically illustrated electrolysis cell 1c. The electrolysis cell 1c is based on the electrolysis cell 1b from FIG. At the method startup, in the case of the electrolysis cell 1c, the line 32 leading from the cathode chamber 3 and the line 52 leading from the anode chamber 5 are connected. A separating device 11 is provided in the line 32 leading from the cathode compartment 3, wherein, in the example shown, hydrogen is separated from the gas mixture formed at the cathode 43 by the separating device 11 and the separated hydrogen is discharged via a line 36. Due to the permanent connection between the cathode chamber 3 and the anode space 5 at the process output, the differential pressure control applied in the electrolysis module 1 from FIG. 1 between the cathode chamber 3 and the anode chamber 5 can be omitted. Only one absolute pressure regulator is required, which in the embodiment of FIG. 4 is realized by the valve 33 at the process outlet.

As shown in FIG. 4, a further separation device 11' can follow the separating device 11 for hydrogen, in which the remaining steam 30' can be wholly or partially separated from the cathode flushing medium 50', whereupon the separated steam 30' can be recirculated and is fed to a process gas inlet of the electrolysis cell 1c. Furthermore, oxygen can also be separated from the anode flush medium 60' by a further separating device 12 from the gas mixture located in the line 52. The connection of the two lines 52 and 32 after the respective separating devices 11, 11', 12 essentially contains the flushing media 50', 60'. If a flushing medium is used only on the anode side or only on the cathode side of the electrolyte module 1, 1a, 1b, 1c, or if the same flushing medium is used on both sides, this flushing medium can also be recirculated.

REFERENCE LIST 1, a, 1b, 1c electrolysis modules
2 container space
3 cathode space
4 electrolysis cell
5 anode space
6 anode flushing medium
11,11' separating device
12 separating device
13, 13' compressors
14, 14' heater/heat exchanger
15 cathode flushing circuit
16 anode flushing circuit
21 line
22 line
23 pressure control unit
25 line
30, 30' reactant
31 media supply
32 line
33 pressure control unit
34 pressure control unit
36 line
43 cathode
44 electrolyte
45 anode
50, 50' second flushing medium
51 media feed line
52 line
53 pressure control unit
54 line
60, 60' first flushing medium
CO carbon dioxide
$H_2$, CO product gas
$H_2$/CO—30 product gas/reactant mixture
$H_2$ hydrogen
$H_2O$ water
$N_2$ nitrogen
$O_2$ oxygen
RSOC reversible solid oxide cell
SOEC solid oxide electrolysis cell
SOC solid oxide cell
50—$H_2$/CO flushing medium/product gas mixture
60—$O_2$ flushing medium/oxygen mixture

The invention claimed is:
1. An electrolysis method with an electrolysis cell (4), operated within a temperature range of 300° C. to 1500° C., comprising the steps of:
   supplying a reactant (30) to the electrolysis cell (4), wherein a product gas including hydrogen and carbon monoxide ($H_2$, CO) is formed at the cathode (43) of the electrolysis cell (4) and oxygen ($O_2$) is formed at the anode (45) of the electrolysis cell (4),
   at least partially transporting away the oxygen ($O_2$) by means of at least one first flushing medium (60) supplied continuously to the electrolysis cell (4), wherein the first flushing medium (60) is inert to oxygen ($O_2$)
   at least partially separating the first flushing medium/oxygen mixture (60—$O_2$) in a separating device (12) into the constituents oxygen ($O_2$) and the at least first flushing medium (60),
   recirculating by reintroducing the separated at least first flushing medium (60) into the electrolysis cell (4) and discharging the separated oxygen ($O_2$), wherein the electrolysis cell (4) is a solid oxide electrolyte cell (SOEC), a solid oxide cell (SOC), or a reversible solid oxide cell (rSOC), wherein, for flushing, as the at least first flushing medium (60), an inert gas or a noble gas, at the working temperature and working pressure of the electrolysis, is used, and wherein this is passed through a closed anode flushing circuit, and wherein the at least partial separation of the oxygen ($O_2$) from the first flushing medium is accomplished with at least one of a separation membrane, a porous separation structure, a sorbent, a pressure change adsorption assembly and a temperature change adsorption assembly.

2. The electrolysis method according to claim 1, wherein an at least partial transport away of the product gas ($H_2$, CO) occurs by flushing via at least one second flushing medium (50), and wherein the flushing medium/product gas mixture (50—$H_2$/CO) is separated in a separating device (11) into the components product gas ($H_2$, $CO_2$) and the at least one second flushing medium (50), wherein the separated least one second flushing medium (50) or flushing medium/product gas mixture (50, $H_2$/CO) or the flushing medium/product gas mixture (50—$H_2$/CO) or the product gas ($H_2$, CO) is re-circulated by reintroducing into the electrolysis cell (4) and an at least a partial discharge of the separated product gas ($H_2$, CO) out of the method, wherein the at least second flushing medium (50) is inert with respect to the product gas ($H_2$, CO).

3. The electrolysis method according to claim 1, wherein less than 100% of the reactants (30) are converted into product gas ($H_2$, CO), so that an at least partial removal of the product gas ($H_2$, CO) takes place via the unreacted reactants (30), wherein the product gas/reactant mixture ($H_2$/CO—30) is at least partially separated in a separating device (11, 12) into the constituents product gas ($H_2$, CO) and reactant (30), wherein there occurs a recirculation of the separated reactant (30) or product gas-reactant mixture ($H_2$/CO—30) and an at least partial discharge of the separated product gas ($H_2$, CO) from the method.

4. The electrolysis method according to claim 1, wherein the electrolysis cell is operated in a temperature range of from 600° C. to 1000° C.

5. An electrolysis method with an electrolysis cell (4), operated within a temperature range of 300° C. to 1500° C. comprising the steps of:

supplying a reactant (30), wherein water ($H_2O$) and carbon dioxide ($CO_2$) are used as the reactant (30) in the form of a gas, steam and/or gaseous vapour, to the electrolysis cell (4), wherein product gasses ($H_2$, CO) formed are hydrogen ($H_2$) and carbon monoxide (CO) at the cathode (43) of the electrolysis cell (4) and oxygen ($O_7$) is formed at the anode (45) of the electrolysis cell (4), at least partially transporting away the oxygen ($O_7$) by means of at least one first flushing medium (60) supplied continuously to the electrolysis cell (4), wherein the first flushing medium (60) is inert to oxygen ($O_2$)

at least partially separating the first flushing medium/oxygen mixture (60—$O_2$) in a separating device (12) into the constituents oxygen ($O_7$) and the at least first flushing medium (60), recirculating by reintroducing the separated at least first flushing medium (60) into the electrolysis cell (4) and discharging the separated oxygen ($O_2$), wherein the electrolysis cell (4) is a solid oxide electrolyte cell (SOEC), a solid oxide cell (SOC), or a reversible solid oxide cell (rSOC), wherein, for flushing, as the at least first flushing medium (60), an inert gas or a noble gas, at the working temperature and working pressure of the electrolysis, is used, and wherein this is passed through a closed anode flushing circuit, and wherein the at least partial separation of the oxygen ($O_2$) from the first flushing medium is accomplished with at least one of a separation membrane, a porous separation structure, a sorbent a pressure change adsorption assembly and a temperature change adsorption assembly.

6. The electrolysis method according to claim 1, wherein prior to reintroduction into the cathode flushing circuit (15)/anode flushing circuit (16) a heating or compressing of at least the first (60)/second (50) flushing medium is carried out.

7. The electrolysis system for carrying out an electrolysis method according to claim 1, wherein the electrolysis cell system has at least three separate pressure chambers including an anode space (5), a cathode space (3), which together form the electrolysis cell (4), and a container space (2), and wherein the anode space (5) and the cathode space (3) are arranged within the container space (2);

for supplying a reactant (30) into the cathode chamber (3) and for supplying at least one first flushing medium (60) into the anode space (5) in each case at least one media feed line (31, 51) is provided;

for removing from the anode space (5) the at least first flushing medium (60) and the oxygen ($O_2$) produced by electrolysis and for the removing from the cathode space (3) a product gas ($H_2$, CO) which is formed by the electrolysis, in each case at least one output line (32, 52) is provided;

either the anode space (5) or the cathode space (3) is connected to the container space (2), so that a flow of gas between the two connected chambers (5-2/3-2) is possible and at least one flushing circuit (15, 16) is provided, so that at least the anode space (5) can be flushed with the first flushing medium (60).

8. The electrolysis system according to claim 7, wherein downstream of the electrolysis cell (4) in the at least one flushing circuit (15, 16) at least one separating device (11, 12) is provided for separating the at least first flushing medium (60)/oxygen ($O_2$), wherein the at least first flushing medium (60) is recirculated via the at least one flushing circuit (15, 16) and the oxygen ($O_2$) is removed from the electrolysis system via a line (54).

9. The electrolysis system according to claim 7, wherein within the container space (2) multiple electrolysis cells (4) with anode spaces (5) and cathode spaces (3) are provided, wherein the anode spaces (5) are connected to each other and the cathode spaces (3) are connected to each other, so that a plurality of cathode spaces (3) are connected to one another to form a common cathode space and a plurality of anode spaces (5) form a common anode space.

10. The electrolysis system according to claim 7, wherein for supplying the gas into the anode chamber (5) and/or the cathode chamber (3) pressure control units (23, 33, 34, 53) are provided, by means of which the respective pressure in the pressure chambers (2, 3, 5) can be adjusted.

11. The electrolysis system according to claim 7, wherein two flushing circuits (15, 16) are provided, so that the anode space (5) is flushable with a first flushing medium (50) and the cathode space (3) is flushable with a second flushing medium (60) and/or the reactants (30).

12. The electrolysis system according to claim 7, wherein for recirculation by means of the at least one flushing circuit (15, 16), a recirculation blower and/or a jet pump and/or heater/heat exchanger (14, 14') is provided.

13. The electrolysis system according to claim 7, wherein during the start-up and/or shutdown operation of the electrolysis cell (4) a temporary connection between the anode space (5) and the cathode space (3) is provided and can be switched, so that a gas flow between the two connected chambers (3, 5) during the period of the electrolysis is possible during the start-up and/or shutdown operation.

14. The electrolysis system according to claim 8, wherein a cooling device for cooling the media (30, 50, 60) supplied to the separating device (11, 12) is provided, wherein the heat which can be extracted there can be used recuperatively for heating the medium(s) to be fed.

15. The electrolysis system according to claim 7, wherein the media supply line(s) (51) and or discharge line(s) (52) for the anode terminate in the container space (2) when the anode space (5) is connected to the container space (2).

16. The electrolysis system according to claim 7, wherein the media supply line(s) (31) and or discharge line(s) (32) for the cathode terminate in the container space (2) when the cathode space (3) is connected to the container space (2).

17. The electrolysis system according to claim 7, wherein the first (60) and the second flushing medium (50) are identical.

18. The electrolysis system according to claim 7, wherein the first (60) and the second flushing medium (50) are nitrogen ($N_2$).

* * * * *